(12) United States Patent
Chan et al.

(10) Patent No.: US 11,334,172 B2
(45) Date of Patent: May 17, 2022

(54) KEYBOARD WITH LIGHT EMITTING FUNCTION AND TOUCH FUNCTION

(71) Applicant: DARFON ELECTRONICS CORP., Taoyuan (TW)

(72) Inventors: Chin-Lung Chan, Taoyuan (TW); Hsin-Hung Liu, Taoyuan (TW); Chih-Ho Hsu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/195,585

(22) Filed: Mar. 8, 2021

(65) Prior Publication Data

US 2021/0349544 A1 Nov. 11, 2021

Related U.S. Application Data

(60) Provisional application No. 63/022,589, filed on May 11, 2020.

(30) Foreign Application Priority Data

Jul. 31, 2020 (TW) .................................. 109125934

(51) Int. Cl.
*G09G 5/00* (2006.01)
*G06F 3/02* (2006.01)
(Continued)

(52) U.S. Cl.
CPC .............. *G06F 3/021* (2013.01); *H01H 13/79* (2013.01); *H01H 13/83* (2013.01)

(58) Field of Classification Search
CPC ............ G06F 3/021; G06F 3/033; G06F 3/02; H01H 13/79; H01H 13/83; G09G 5/00; G09G 5/08; H03K 17/94; H03M 11/00
See application file for complete search history.

(56) References Cited

U.S. PATENT DOCUMENTS 6,204,839 B1  3/2001  Mato, Jr.
8,760,273 B2  6/2014  Casparian
(Continued)

FOREIGN PATENT DOCUMENTS

CN    101174511 A    5/2008
CN    203179767 U    9/2013
(Continued)

*Primary Examiner* — Pegeman Karimi
(74) *Attorney, Agent, or Firm* — Winston Hsu (57) ABSTRACT

A keyboard with light-emitting and touch functions includes a keyswitch, a backlight module having a light source and a light guide plate, a membrane, a capacitive touch sensing sheet disposed on the membrane and the light guide plate, and a board. The keyswitch includes a cap and a support mechanism movably connected to the cap. Light of the light source is incident into the light guide plate and is emitted toward the cap. The membrane has a switch and is selectively disposed on or under the backlight module. The board is disposed under the backlight module and the membrane and has first and second connection members. The first and second connection members pass through the membrane, the light guide plate and the capacitive touch sensing sheet to be movably connected to the support mechanism, so as to make the cap movable downward relative to the board for triggering the switch.

21 Claims, 9 Drawing Sheets

(51) Int. Cl.
*H01H 13/79* (2006.01)
*H01H 13/83* (2006.01)

(56) References Cited

U.S. PATENT DOCUMENTS

| | | | |
|---|---|---|---|
| 9,230,753 B2 | 1/2016 | Chen | |
| 2012/0286976 A1* | 11/2012 | Chen | H01H 13/83 341/22 |
| 2013/0135211 A1 | 5/2013 | Chiang | |
| 2014/0367238 A1* | 12/2014 | Chen | H01H 13/83 200/5 A |
| 2015/0014135 A1* | 1/2015 | Ho | H01H 13/83 200/5 A |
| 2015/0014136 A1* | 1/2015 | Liang | H01H 13/83 200/5 A |
| 2016/0070404 A1* | 3/2016 | Kerr | G06K 9/00013 345/174 |
| 2018/0217668 A1 | 8/2018 | Ligtenberg | |
| 2020/0209464 A1* | 7/2020 | Jeon | G02B 1/045 |

FOREIGN PATENT DOCUMENTS

| | | |
|---|---|---|
| CN | 103839722 A | 6/2014 |
| CN | 109871063 A | 6/2019 |
| TW | I489500 B | 6/2015 |
| TW | I545494 B | 8/2016 |

\* cited by examiner

KEYBOARD WITH LIGHT EMITTING FUNCTION AND TOUCH FUNCTION

CROSS REFERENCE TO RELATED APPLICATIONS

This application claims the benefit of U.S. Provisional Application No. 63/022,589, which was filed on May 11, 2020, and is incorporated herein by reference.

BACKGROUND OF THE INVENTION

1. Field of the Invention

The present invention relates to a keyboard, and more specifically, to a keyboard with light-emitting and touch functions.

2. Description of the Prior Art

With development of touch sensing technology, a capacitive touch sensing sheet has been integrated into a keyboard to make the keyboard have a keyswitch input function and a touch function, so as to improve convenience of the keyboard in use. In the prior art, a conventional design involves forming corresponding assembly holes on the capacitive touch sensing sheet so that the capacitive touch sensing sheet could be directly disposed under keycaps of the keyboard. However, the aforesaid design usually results in a time-consuming and strenuous assembly process of the keyboard. In addition, if a light-emitting function is further integrated into the aforesaid keyboard, it may cause the problem that the keyboard has an excessive thickness, so as to be disadvantageous to the thinning design of the keyboard.

SUMMARY OF THE INVENTION

The present invention provides a keyboard with light-emitting and touch functions. The keyboard includes a plurality of keyswitches, a backlight module, a membrane, a capacitive touch sensing sheet, and a board. Each keyswitch includes a cap and a support mechanism. The support mechanism is movably connected to the cap. The backlight module has a light source and a light guide plate. Light of the light source is incident into the light guide plate and is emitted toward each cap from the light guide plate. The membrane has a switch corresponding to each cap. The membrane is selectively disposed on or under the backlight module. The capacitive touch sensing sheet is disposed on the membrane and the light guide plate. The board is disposed under the backlight module and the membrane. The board has a first connection member and a second connection member corresponding to each cap. The first connection member and the second connection member pass through the membrane, the light guide plate, and the capacitive touch sensing sheet to be movably connected to the support mechanism, so as to make the cap movable downward relative to the board for triggering the switch.

The present invention further provides a keyboard with light-emitting and touch functions. The keyboard includes a plurality of keyswitches, a backlight module, a membrane, and a capacitive touch sensing sheet. Each keyswitch includes a cap and a support mechanism. The support mechanism is movably connected to the cap. The backlight module has a light source and a light guide plate. The light guide plate has a first connection member and a second connection member corresponding to each cap. Light of the light source is incident into the light guide plate and is emitted toward each cap from the light guide plate. The membrane has a switch corresponding to each cap. The membrane is disposed under the light guide plate. The capacitive touch sensing sheet is disposed on the light guide plate. The first connection member and the second connection member pass through the capacitive touch sensing sheet to be movably connected to the support mechanism, so as to make the cap movable downward relative to the membrane for triggering the switch.

The present invention further provides a keyboard with light-emitting and touch functions. The keyboard includes a plurality of keyswitches, a membrane, a backlight module, and a capacitive touch sensing sheet. Each keyswitch includes a cap and a support mechanism. The support mechanism is movably connected to the cap. The membrane has a switch corresponding to each cap. The backlight module is disposed on the membrane. The backlight module has a light source and a light guide plate. The light guide plate has a first connection member and a second connection member corresponding to each cap. The first connection member and the second connection member are movably connected to the support mechanism, so as to make the cap movable downward relative to the membrane for triggering the switch. Light of the light source is incident into the light guide plate and is emitted toward each cap from the light guide plate. The capacitive touch sensing layer is formed under the light guide plate.

The present invention further provides a keyboard with light-emitting and touch functions. The keyboard includes a plurality of keyswitches, a backlight module, a board, a membrane, and a capacitive touch sensing layer. Each keyswitch includes a cap and a support mechanism. The support mechanism is movably connected to the cap. The backlight module has a light source and a light guide plate. Light of the light source is incident into the light guide plate and is emitted toward each cap from the light guide plate. The board is disposed on the backlight module. The board has a first connection member and a second connection member corresponding to each cap. The membrane has a switch corresponding to each cap. The membrane is disposed on the board. The capacitive touch sensing sheet is disposed on the membrane. The first connection member and the second connection member pass through the capacitive touch sensing sheet and the membrane to be movably connected to the support mechanism, so as to make the cap movable downward relative to the board for triggering the switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
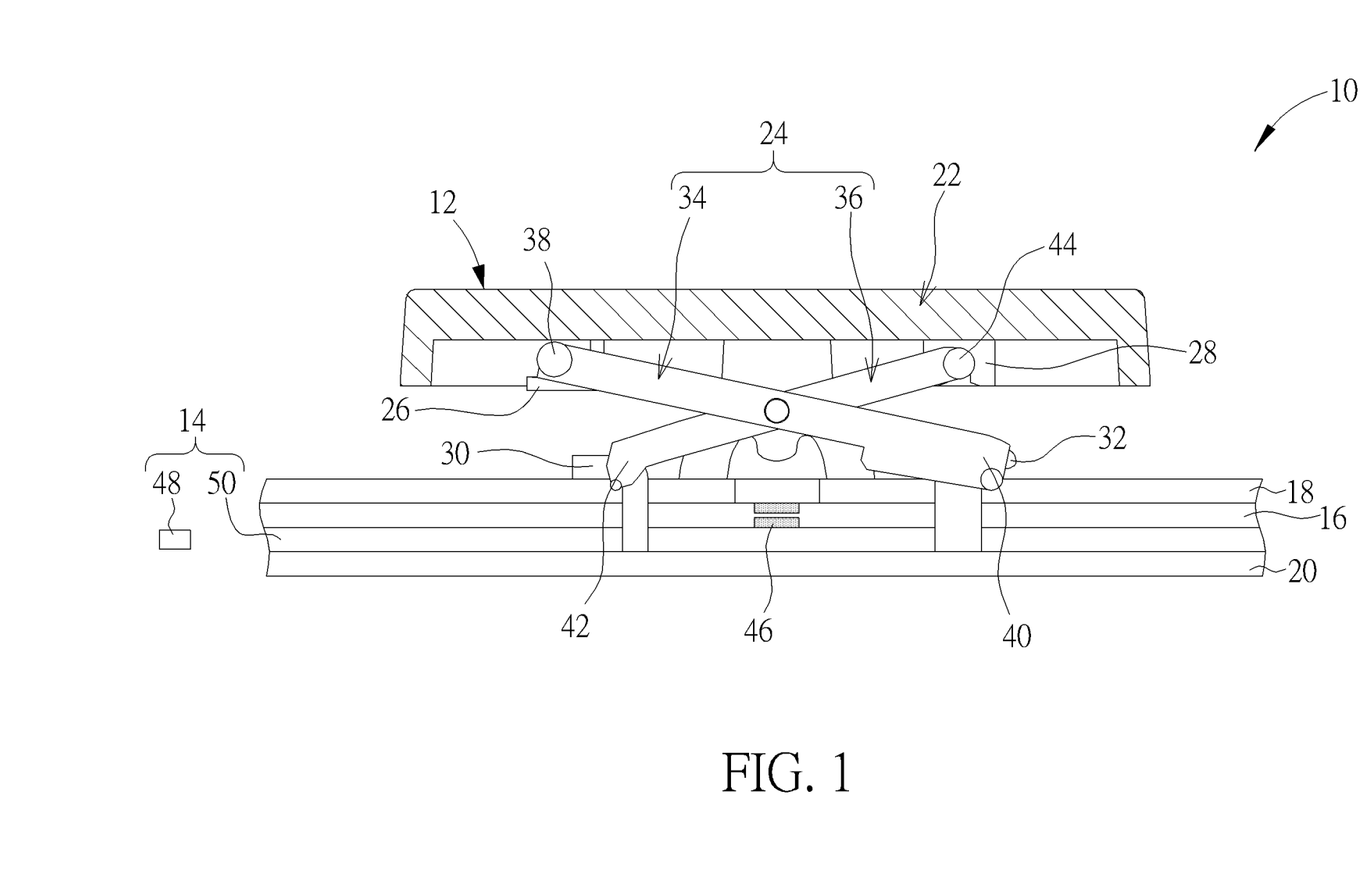
FIG. 1 is a partial cross-sectional diagram of a keyboard according to an embodiment of the present invention.

Please refer to FIG. 1, which is a partial cross-sectional diagram of a keyboard 10 according to an embodiment of the present invention. The keyboard 10 has a light emitting function and a touch function and could be preferably a conventional keyboard apparatus applied to a computer device, but not limited thereto. For example, the keyboard 10 could be preferably applied to a portable electronic device with a foldable mechanism composed of an upper cover and a lower casing (e.g. a notebook or a foldable keyboard, but not limited thereto). As shown in FIG. 1, the keyboard 10 includes a plurality of keyswitches 12 (only one shown in FIG. 1, but not limited thereto), a backlight module 14, a membrane 16, a capacitive touch sensing sheet 18, and a board 20. The keyswitch 12 is disposed on the board 20 for a user to press, so as to perform desired input functions.

The keyswitch 12 includes a cap 22 and a support mechanism 24. The support mechanism 24 is movably connected to the cap 22. To be more specific, the support mechanism 24 preferably adopts a scissor frame design (but not limited thereto, meaning that the present invention could adopt other support frame design, such as a butterfly frame design). For example, in this embodiment, the cap 22 has a sliding groove 26 and an engaging groove 28, the board 20 has a first connection member 30 and a second connection member 32 corresponding to the cap 22, and the support mechanism 24 includes a first support member 34 and a second support member 36. The first support member 34 rotatably intersects with the second support member 36. The first support member 34 has a first sliding portion 38 and a first pivot portion 40. When the first support member 34 is assembled with the cap 22, the first sliding portion 38 is slidably disposed in the sliding groove 26, and the first pivot portion 40 is rotatably connected to the second connection member 32. The second support member 36 has a second sliding portion 42 and a second pivot portion 44. When the second support member 36 is assembled with the cap 22, the second sliding portion 42 is slidably disposed in the first connection member 30, and the second pivot portion 44 is rotatably connected to the engaging groove 28. Accordingly, via the aforesaid connection design of the support mechanism 24, the cap 22 can move upward and downward relative to the board 20.

Furthermore, the backlight module 14 is disposed on the board 20, and the membrane 16 has a switch 46 corresponding to each cap 22 and is disposed on the backlight module 14. The backlight module 14 has a light source 48 (preferably a light emitting diode, but not limited thereto) and a light guide plate 50. The light source 48 could be preferably dispose at a side of the light guide plate 50 (but not limited thereto, meaning that the present invention could adopt the design that the light guide plate 48 is contained in the light guide plate 50 in another embodiment). As such, light of the light source 48 can be incident into the light guide plate 50 and then emitted to each cap 22 from the light guide plate 50, so that the keyboard 10 can have a light-emitting function. As mentioned above and as shown in FIG. 1, the first connection member 30 and the second connection member 32 pass through the membrane 16, the light guide plate 50, and the capacitive touch sensing sheet 18 to be movably connected to the support mechanism 24, so as to make the cap 22 movable downward relative to the board 20 for triggering the switch 46 to perform the desired input functions. To be noted, in another embodiment, the present invention could adopt the design that the membrane 16 is disposed between the backlight module 14 and the board 20, and the related description could be reasoned by analogy according to the aforesaid description and omitted herein.

Figure 2:
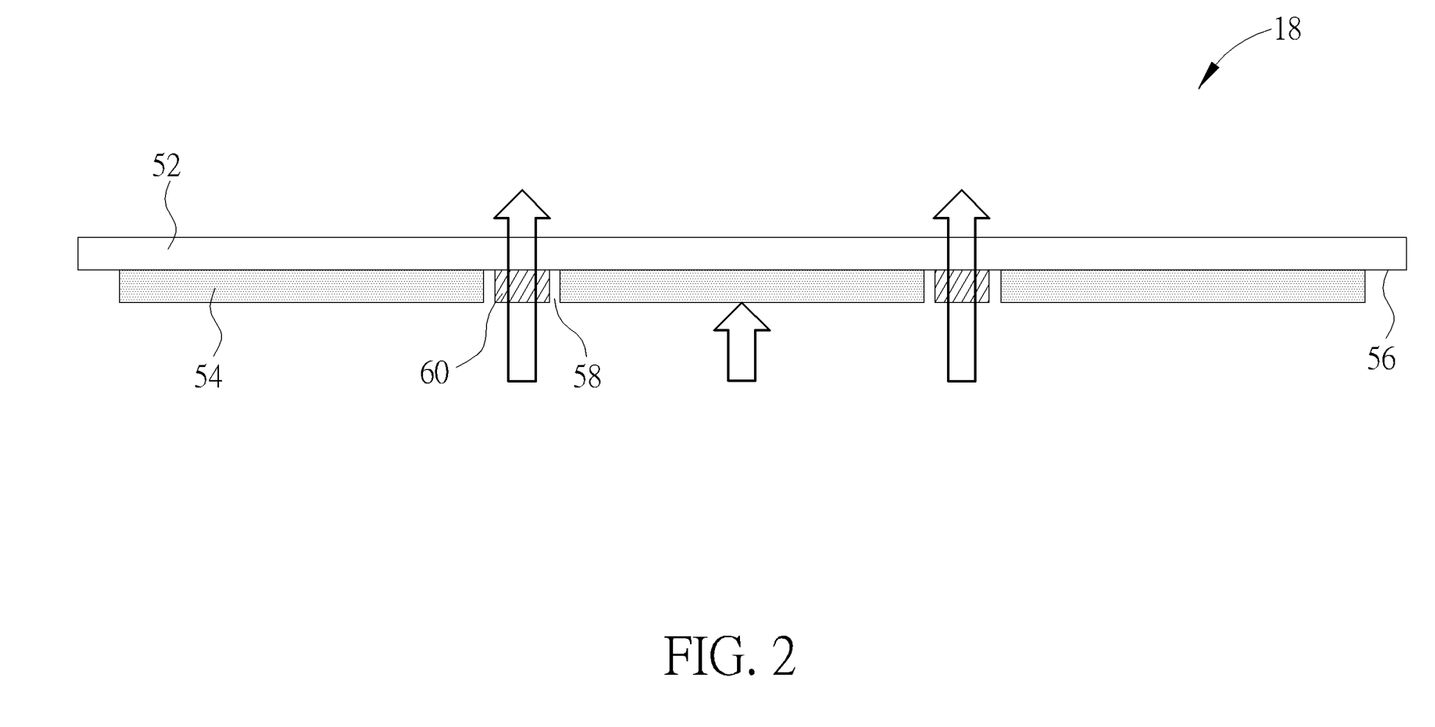
FIG. 2 is a partial cross-sectional diagram of a capacitive touch sensing sheet in FIG. 1.
Figure 3:
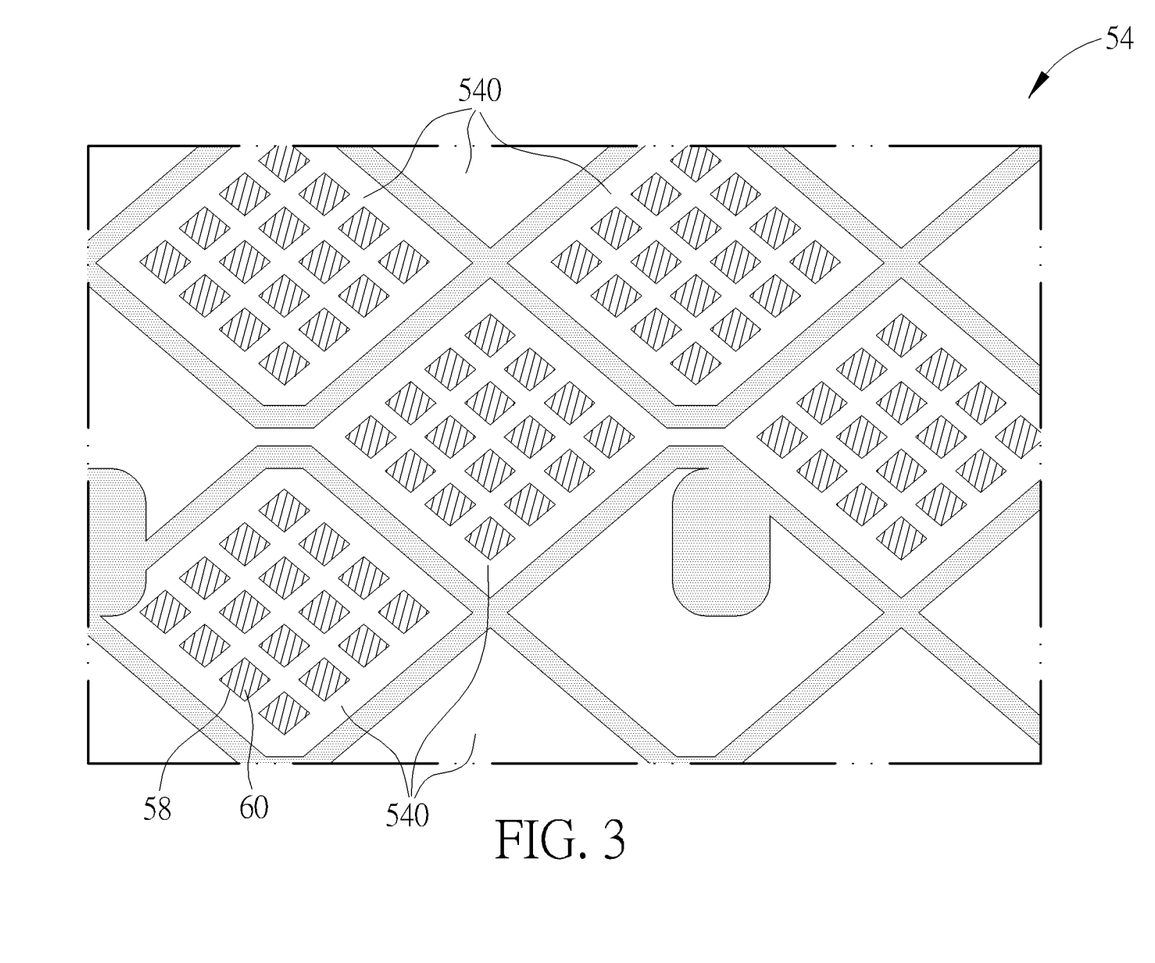
FIG. 3 is a partial enlarged diagram of a circuit layout of a touch electrode layer in FIG. 2.

More detailed description for the design of the capacitive touch sensing sheet 18 is provided as follows. Please refer to FIG. 1, FIG. 2, and FIG. 3. As shown in FIG. 1, FIG. 2, and FIG. 3, the capacitive touch sensing sheet 18 is used to provide a touch signal to a computer device having the keyboard 10 for a user to perform related touch input operations (e.g. moving a cursor). The capacitive touch sensing sheet 18 includes a transparent substrate 52 and a touch electrode layer 54. The touch electrode layer 54 (X-Y axial electrodes 540 of the touch electrode layer 54 are as shown in FIG. 3, and the related description is omitted herein since it is commonly seen in the prior art) is formed on a bottom surface 56 of the transparent substrate 52 and has a light exit region 58 corresponding to each cap 22. A scattering structure 60 is formed on the transparent substrate 52 corresponding to the light exit region 58, and the present invention could adopt a conventional scattering microstructural design, such as mesh dot, zigzag, groove, stamping microstructures or the combination thereof (but not limited thereto). In this embodiment, the scattering structure 60 is formed in the light exit region 58, which means the scattering structure 60 and the touch electrode layer 54 are located at the same layer as shown in FIG. 3. In such a manner, light emitted out of the light guide plate 50 passes through the light exit region 58, and scattering of the light occurs at the scattering structure 60 to guide the light toward the corresponding cap 22, so as to generate the light emitting effect.

In summary, the present invention adopts the design that the capacitive touch sensing sheet is directly stacked on the membrane, the backlight module, and the board to replace the prior art design that the capacitive touch sensing sheet is disposed under the cap, so as to efficiently solve the prior art problem that the assembly process of the capacitive touch sensing sheet and the cap is time-consuming and strenuous for reducing the manufacturing cost of the keyboard. Furthermore, via the aforesaid design that the scattering structure is formed on the capacitive touch sensing sheet, light emitted by the backlight module can be incident to the cap more evenly, so as to efficiently improve the light emitting effect and the light use efficiency of the keyboard.

Figure 4:
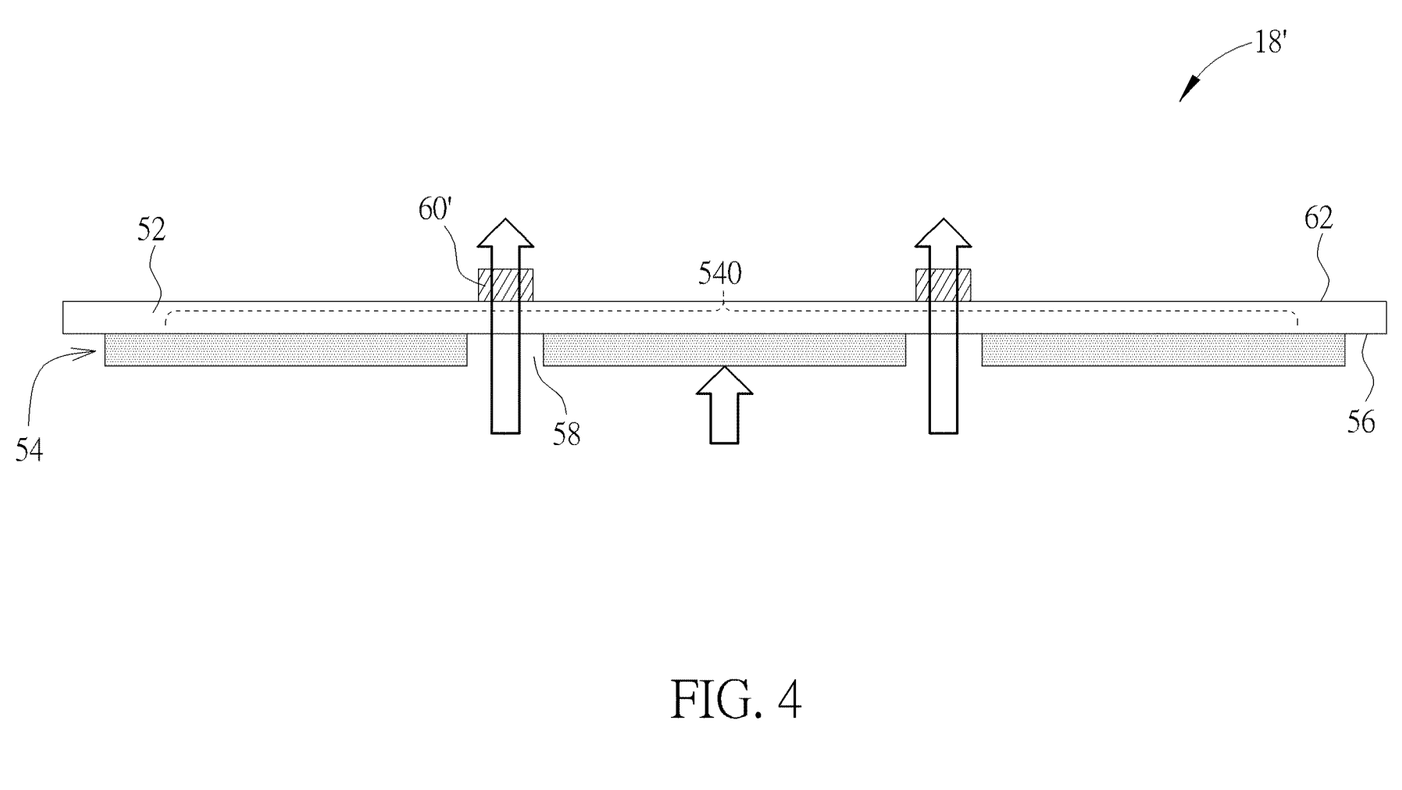
FIG. 4 is a partial cross-sectional diagram of a capacitive touch sensing sheet according to another embodiment of the present invention.

In practical application, the design of the capacitive touch sensing sheet is not limited to the aforesaid embodiment. For example, please refer to FIG. 4, which is a partial cross-sectional diagram of a capacitive touch sensing sheet 18' according to another embodiment of the present invention. Components both mentioned in this embodiment and the aforesaid embodiments represent components with similar structures or functions, and the related description is omitted herein. As shown in FIG. 4, the capacitive touch sensing sheet 18' includes the transparent substrate 52 and the touch electrode layer 54. A scattering structure 60' is formed on the transparent substrate 52 corresponding to the light exit region 58, and the present invention could adopt a conventional scattering microstructural design, such as mesh dot, zigzag, groove, stamping microstructures or the combination thereof (but not limited thereto). In this embodiment, the scattering structure 60' is formed on a top surface 62 of the transparent substrate 52, which means the scattering structure 60' and the touch electrode layer 54 are located at different layers as shown in FIG. 4. In such a manner, light emitted out of the light guide plate 50 passes through the light exit region 58, and scattering of the light occurs at the scattering structure 60' to guide the light toward the corresponding cap 22, so as to generate the light emitting effect.

Figure 5:
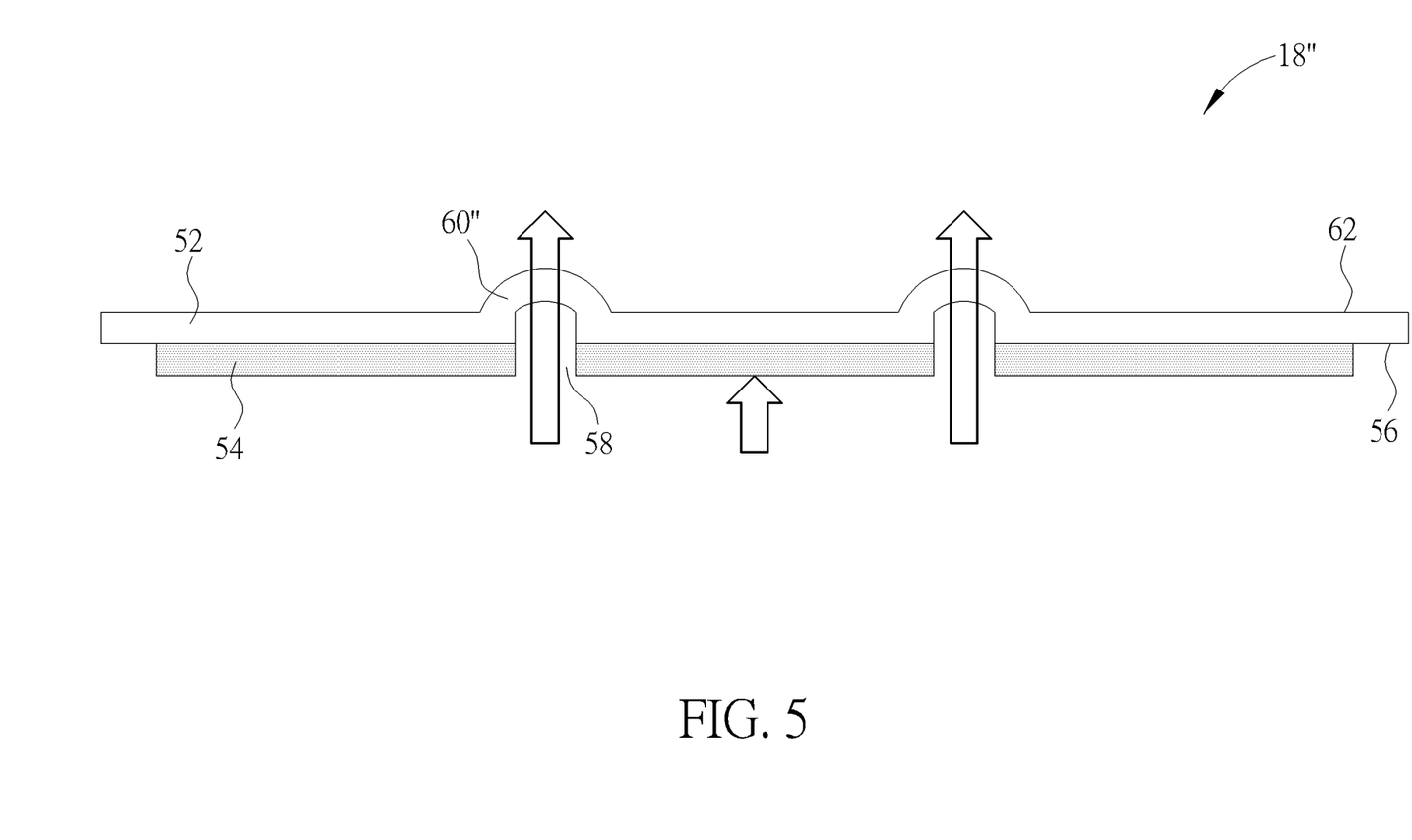
FIG. 5 is a partial cross-sectional diagram of a capacitive touch sensing sheet according to another embodiment of the present invention.

Please refer to FIG. 5, which is a partial cross-sectional diagram of a capacitive touch sensing sheet 18" according to another embodiment of the present invention. Components both mentioned in this embodiment and the aforesaid embodiments represent components with similar structures or functions, and the related description is omitted herein. As shown in FIG. 5, the capacitive touch sensing sheet 18" includes the transparent substrate 52 and the touch electrode layer 54. A scattering structure 60" is formed on the transparent substrate 52 corresponding to the light exit region 58. In this embodiment, the scattering structure 60" is a curved-surface structure protruding from the top surface 62 of the transparent substrate 52. Accordingly, light emitted out of the light guide plate 50 passes through the light exit region 58, and scattering of the light occurs at the scattering structure 60" to guide the light toward the corresponding cap 22, so as to generate the light emitting effect.

Figure 6:
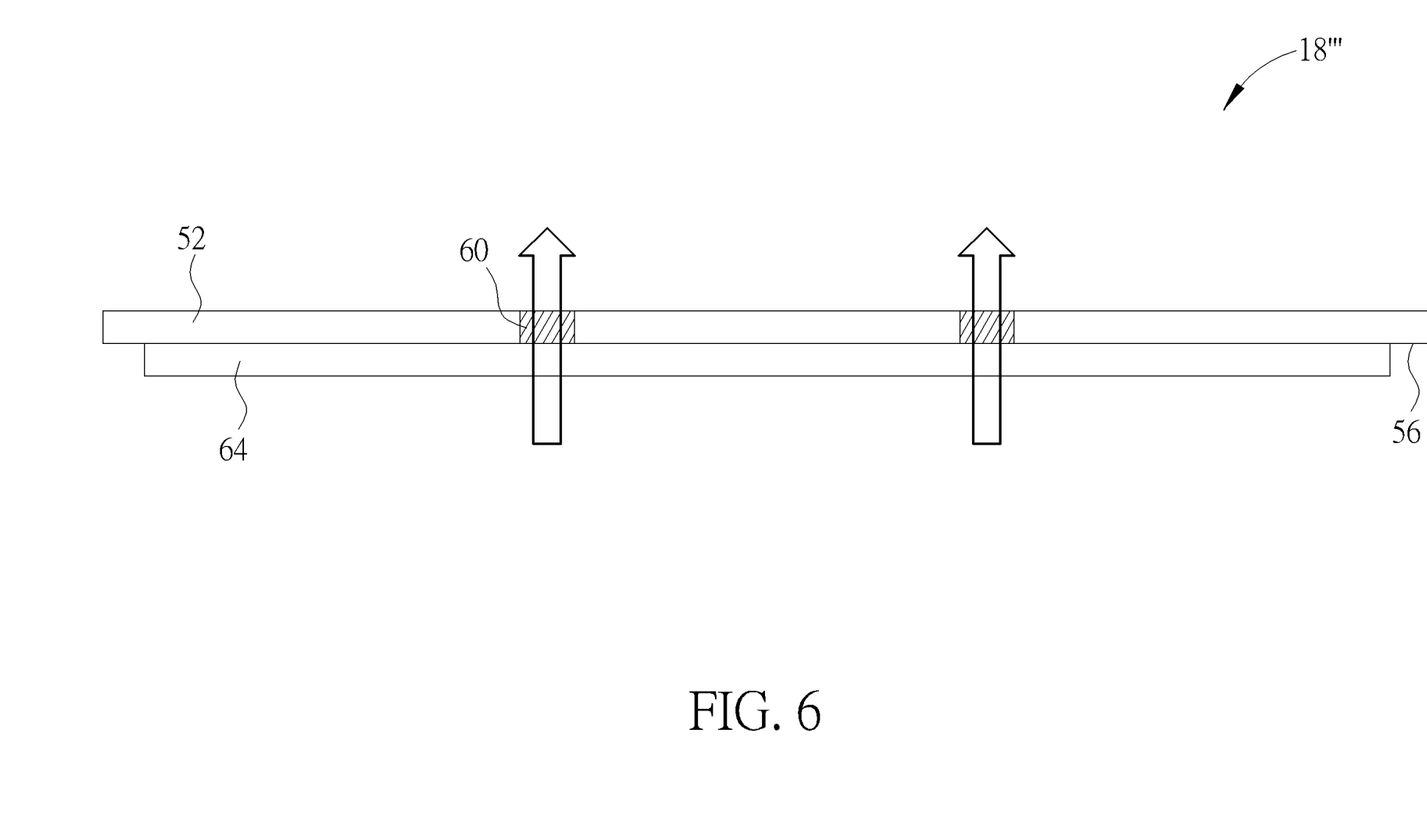
FIG. 6 is a partial cross-sectional diagram of a capacitive touch sensing sheet according to another embodiment of the present invention.

Please refer to FIG. 6, which is a partial cross-sectional diagram of a capacitive touch sensing sheet 18''' according to another embodiment of the present invention. Components both mentioned in this embodiment and the aforesaid embodiments represent components with similar structures or functions, and the related description is omitted herein. As shown in FIG. 6, the capacitive touch sensing sheet 18''' includes the transparent substrate 52 and a transparent touch electrode layer 64. The transparent touch electrode layer 64 (preferably made of ITO (Indium Tin Oxide) material, but not limited thereto) is formed on the bottom surface 56 of the transparent substrate 52. The scattering structure 60 is formed at a position of the transparent substrate 52 where light is incident to each cap 22. Accordingly, light emitted out of the light guide plate 50 passes through the light exit region 58, and scattering of the light occurs at the scattering structure 60 to guide the light toward the corresponding cap 22, so as to generate the light emitting effect.

Figure 7:
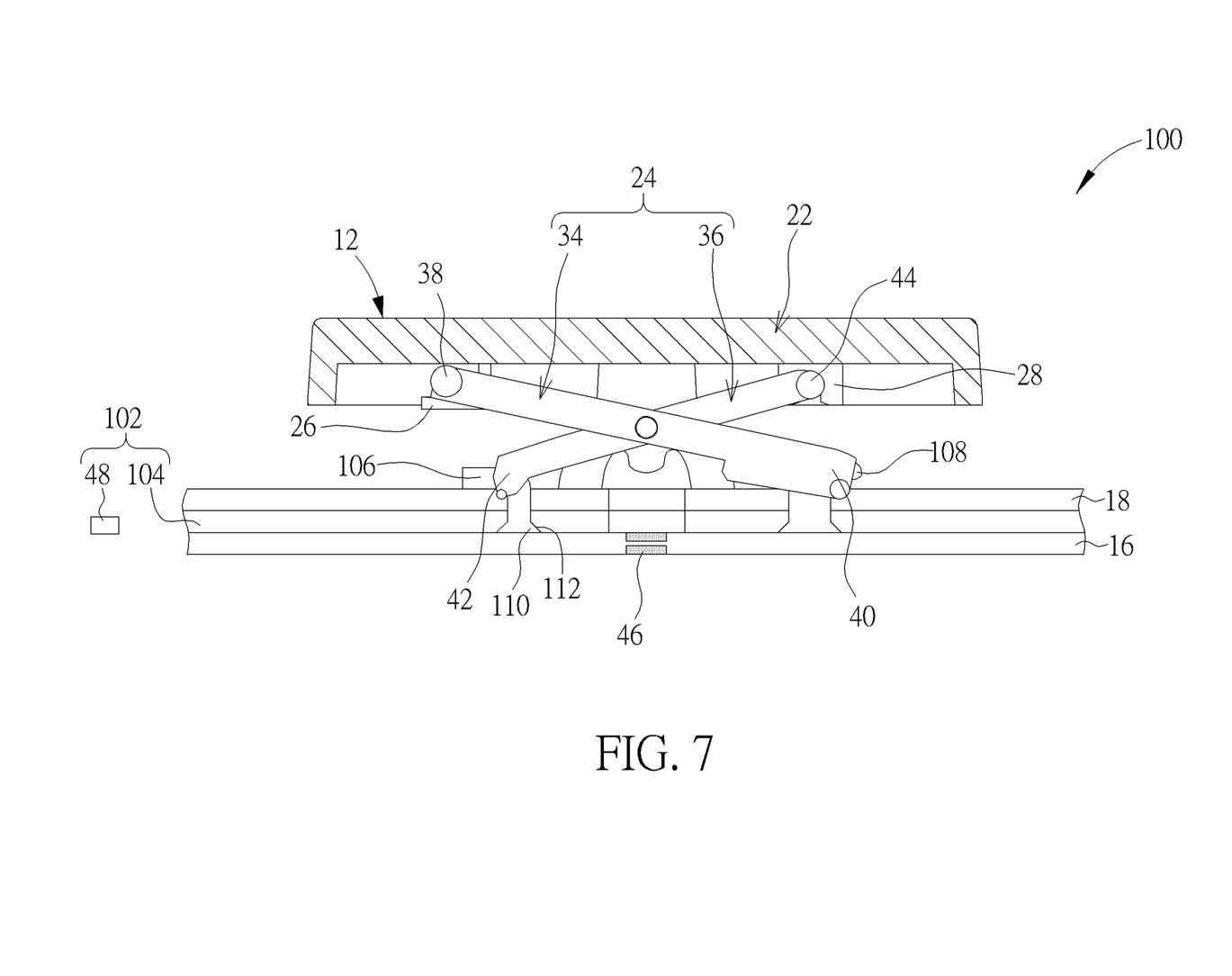
FIG. 7 is a partial cross-sectional diagram of a keyboard according to another embodiment of the present invention.

It should be mentioned that the configuration of the capacitive touch sensing sheet and the backlight module is not limited to the aforesaid embodiments. For example, please refer to FIG. 7, which is a partial cross-sectional diagram of a keyboard 100 according to another embodiment of the present invention. Components both mentioned in this embodiment and the aforesaid embodiments represent components with similar structures or functions, and the related description is omitted herein. As shown in FIG. 7, the keyboard 100 includes the plurality of keyswitches 12 (only one shown in FIG. 7, but not limited thereto), a backlight module 102, the membrane 16, and the capacitive touch sensing sheet 18. The backlight module 102 has the light source 48 and a light guide plate 104. The light guide plate 104 has a first connection member 106 and a second connection member 108 corresponding to each cap 22. The membrane 16 is disposed under the light guide plate 104 and has the switch 46 corresponding to each cap 22. The capacitive touch sensing sheet 18 is disposed on the light guide plate 104. In this embodiment, the first connection member 106 and the second connection member 108 could be preferably connected to the light guide plate 104 by an insert molding process or a thermoforming process (but not limited thereto, meaning that the present invention could adopt other connection design in another embodiment, such as a structural engagement design or a riveting design). For example, the first connection member 106 could have a fixing end portion 110, and the light guide plate 104 could have a concave slot 112 formed thereon corresponding to the fixing end portion 110. The fixing end portion 110 is contained in the concave slot 112 (e.g. by structural engagement or riveting) to fix the first connection member 106 to the light guide plate 104. In such a manner, the capacitive touch sensing sheet 18 can be used to provide a touch signal to a computer device having the keyboard 100 for a user to perform related touch input operations (e.g. moving a cursor), and light of the light source 48 can be emitted from the light guide plate 104 toward each cap 22 so that the keyboard 100 can have a light-emitting function. As shown in FIG. 7, the first connection member 106 and the second connection member 108 pass through the capacitive touch sensing sheet 18 to be movably connected to the support mechanism 24, so as to make the cap 22 movable downward relative to the membrane 16 for triggering the switch 46 to perform the desired input functions.

In this embodiment, the present invention adopts the design that the capacitive touch sensing sheet is stacked on the backlight module to replace the prior art design that the capacitive touch sensing sheet is disposed under the cap, and adopts the design that the first connection member and the second connection member are directly disposed on the light guide plate for omitting the board. Thus, the present invention can efficiently solve the prior art problem that the assembly process of the capacitive touch sensing sheet and the cap is time-consuming and strenuous and the keyboard has an excessive thickness, so as to reduce the manufacturing cost of the keyboard and be advantageous to the thinning design of the keyboard. As for the other related designs (e.g. the designs of the capacitive touch sensing sheet and the scattering structure) of the keyboard 100, the related description can be reasoned by analogy according to the aforesaid embodiments and omitted herein.

Figure 8:
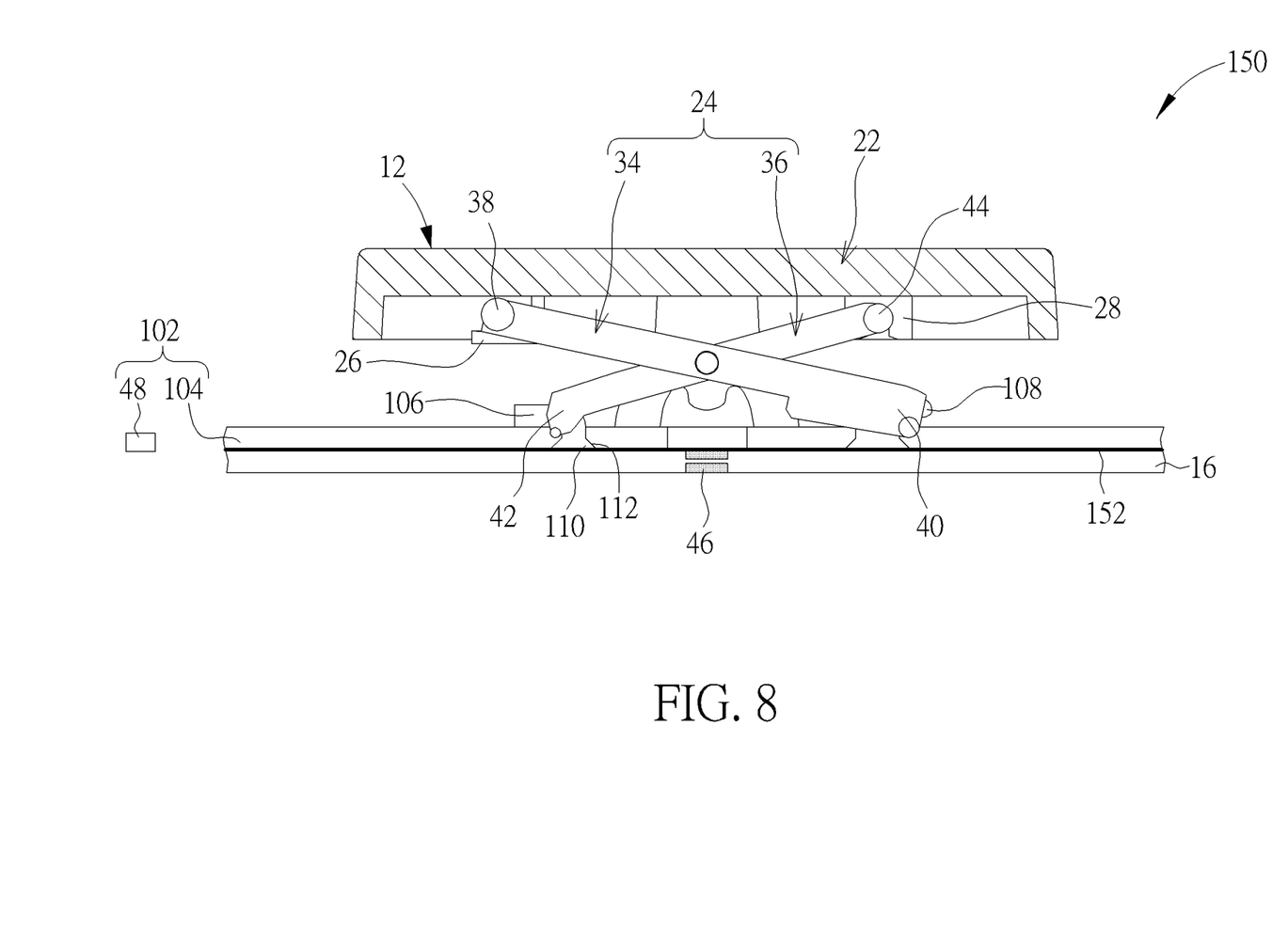
FIG. 8 is a partial cross-sectional diagram of a keyboard according to another embodiment of the present invention.

Furthermore, please refer to FIG. 8, which is a partial cross-sectional diagram of a keyboard 150 according to another embodiment of the present invention. Components both mentioned in this embodiment and the aforesaid embodiments represent components with similar structures or functions, and the related description is omitted herein. As shown in FIG. 8, the keyboard 150 includes the plurality of keyswitches 12 (only one shown in FIG. 8, but not limited thereto), the backlight module 102, the membrane 16, and a capacitive touch sensing layer 152. The capacitive touch sensing layer 152 (the X-Y axial electrode configuration of the capacitive touch sensing layer 152 could be reasoned by analogy according to FIG. 3, and the related description is omitted herein) is formed under the light guide plate 104 to provide a touch signal to a computer device having the keyboard 150 for a user to perform related touch input operations (e.g. moving a cursor). In this embodiment, the present invention adopts the design that the capacitive touch sensing layer is directly formed under the light guide plate of the backlight module for further reducing the overall thickness of the keyboard 150, so as to be advantageous to the thinning design of the keyboard 150. As for the other related designs (e.g. the design of the scattering structure and the design of the connection member of the light guide plate) of the keyboard 150, the related description can be reasoned by analogy according to the aforesaid embodiments and omitted herein.

Figure 9:
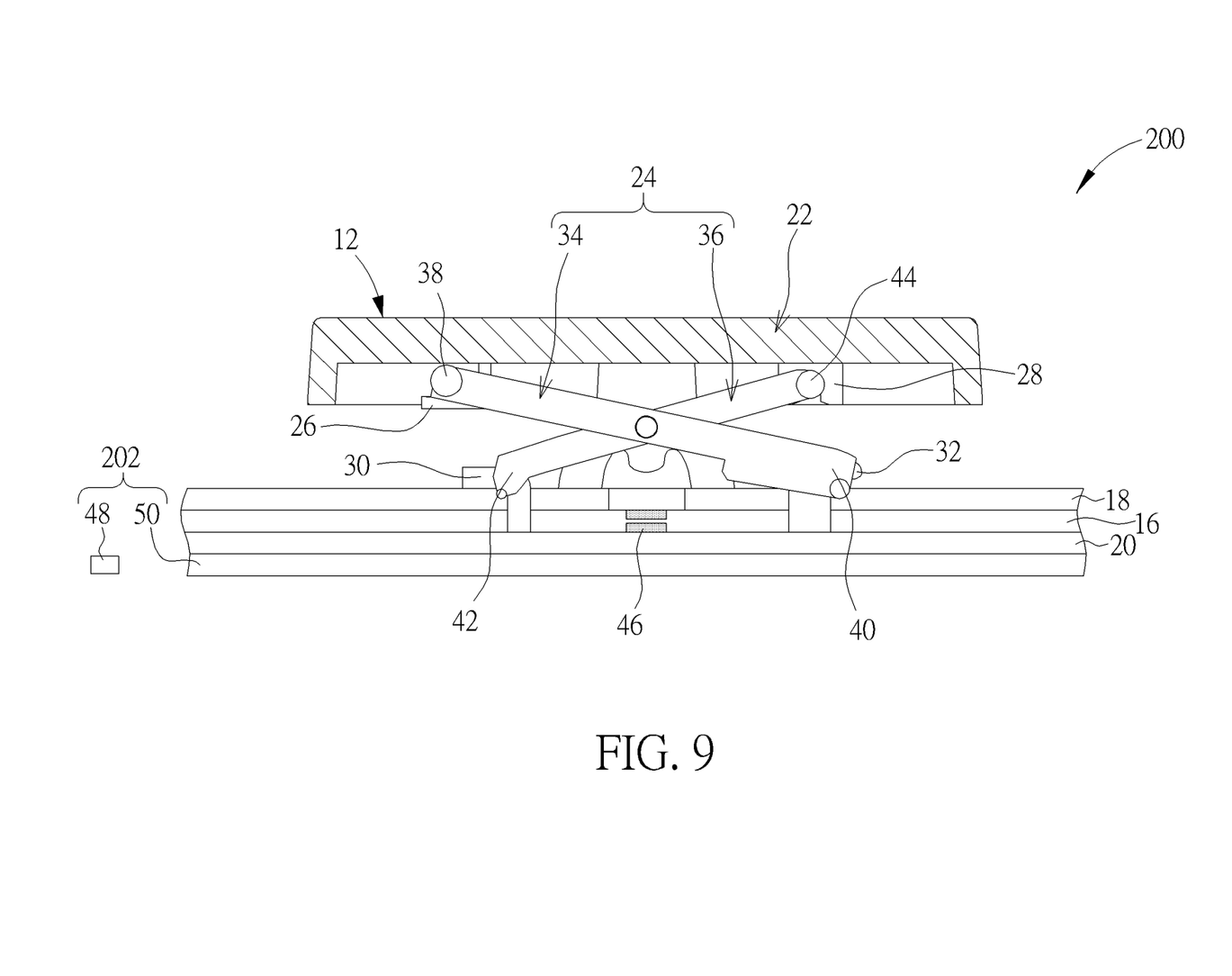
FIG. 9 is a partial cross-sectional diagram of a keyboard according to another embodiment of the present invention.

Moreover, please refer to FIG. 9, which is a partial cross-sectional diagram of a keyboard 200 according to another embodiment of the present invention. Components both mentioned in this embodiment and the aforesaid embodiments represent components with similar structures or functions, and the related description is omitted herein. As shown in FIG. 9, the keyboard 200 includes the plurality of keyswitches 12 (only one shown in FIG. 9, but not limited thereto), a backlight module 202, the membrane 16, the capacitive touch sensing sheet 18, and the board 20. The backlight module 202 is disposed under the board 20 and has the light source 48 and the light guide plate 50. Accordingly, light of the light source 48 can be incident into the light guide plate 50 and then emitted to each cap 22 from the light guide plate 50, so that the keyboard 200 can have a light-emitting function. As mentioned above and as shown in FIG. 9, the first connection member 30 and the second connection member 32 pass through the membrane 16 and the capacitive touch sensing sheet 18 to be movably connected to the support mechanism 24, so as to make the cap 22 movable downward relative to the board 20 for triggering the switch 46 to perform the desired input functions. As for the other related designs (e.g. the designs of the capacitive touch sensing sheet and the scattering structure) of the keyboard 200, the related description can be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard with light-emitting and touch functions, the keyboard comprising:
   a plurality of keyswitches, each keyswitch comprising a cap and a support mechanism, the support mechanism being movably connected to the cap;
   a backlight module having a light source and a light guide plate, light of the light source being incident into the light guide plate and being emitted toward each cap from the light guide plate;
   a membrane having a switch corresponding to each cap, the membrane being selectively disposed on or under the backlight module;
   a capacitive touch sensing sheet disposed on the membrane and the light guide plate; and
   a board disposed under the backlight module and the membrane, the board having a first connection member and a second connection member corresponding to each cap, and the first connection member and the second connection member passing through the membrane, the light guide plate, and the capacitive touch sensing sheet to be movably connected to the support mechanism, so as to make the cap movable downward relative to the board for triggering the switch;
   wherein the capacitive touch sensing sheet comprises a touch electrode layer with a plurality of electrodes, and at least a light exit region is defined within at least one of the plurality of electrodes to permit light emitted from the light guide plate to pass through the light exit region and the cap.

2. The keyboard of claim 1, wherein the capacitive touch sensing sheet comprises a transparent substrate, the touch electrode layer is formed on a bottom surface of the transparent substrate, and the transparent substrate has a scattering structure formed thereon corresponding to the light exit region to make light emitted from the light guide plate pass through the light exit region and scatter at the scattering structure to be incident to the corresponding cap.

3. The keyboard of claim 2, wherein the scattering structure is formed in the light exit region or formed on a top surface of the transparent substrate.

4. The keyboard of claim 3, wherein the scattering structure is a curved-surface structure protruding from the top surface.

5. A keyboard with light-emitting and touch functions, the keyboard comprising:
   a plurality of keyswitches, each keyswitch comprising a cap and a support mechanism, the support mechanism being movably connected to the cap;
   a backlight module having a light source and a light guide plate, light of the light source being incident into the light guide plate and being emitted toward each cap from the light guide plate;
   a membrane having a switch corresponding to each cap, the membrane being selectively disposed on or under the backlight module;
   a capacitive touch sensing sheet disposed on the membrane and the light guide plate, wherein the capacitive touch sensing sheet comprises a transparent substrate and a transparent touch electrode layer, the transparent touch electrode layer is formed on a bottom surface of the transparent substrate, and light emitted out of the light guide plate passes through the transparent touch electrode layer and the transparent substrate to be incident to each cap; and
   a board disposed under the backlight module and the membrane, the board having a first connection member and a second connection member corresponding to each cap, and the first connection member and the second connection member passing through the membrane, the light guide plate, and the capacitive touch sensing sheet to be movably connected to the support mechanism, so as to make the cap movable downward relative to the board for triggering the switch.

6. The keyboard of claim 5, wherein a scattering structure is formed at a position of the transparent substrate where light is incident to each cap.

7. A keyboard with light-emitting and touch functions, the keyboard comprising:
   a plurality of keyswitches, each keyswitch comprising a cap and a support mechanism, the support mechanism being movably connected to the cap;
   a backlight module having a light source and a light guide plate, the light guide plate having a first connection member and a second connection member corresponding to each cap, light of the light source being incident into the light guide plate and being emitted toward each cap from the light guide plate;
   a membrane having a switch corresponding to each cap, the membrane being disposed under the light guide plate; and
   a capacitive touch sensing sheet disposed on the light guide plate, the light guide plate being disposed between the membrane and the capacitive touch sensing sheet, the first connection member and the second connection member passing through the capacitive touch sensing sheet to be movably connected to the support mechanism, so as to make the cap movable downward relative to the membrane for triggering the switch;

wherein the capacitive touch sensing sheet comprises a touch electrode layer with a plurality of electrodes, and at least a light exit region is defined within at least one of the plurality of electrodes to permit light emitted from the light guide plate to pass through the light exit region and the cap.

8. The keyboard of claim 7, wherein the capacitive touch sensing sheet comprises a transparent substrate, the touch electrode layer is formed on a bottom surface of the transparent substrate, and the transparent substrate has a scattering structure formed thereon corresponding to the light exit region to make light emitted from the light guide plate pass through the light exit region and scatter at the scattering structure to be incident to the corresponding cap.

9. The keyboard of claim 8, wherein the scattering structure is formed in the light exit region or formed on a top surface of the transparent substrate.

10. The keyboard of claim 9, wherein the scattering structure is a curved-surface structure protruding from the top surface.

11. A keyboard with light-emitting and touch functions, the keyboard comprising:
a plurality of keyswitches, each keyswitch comprising a cap and a support mechanism, the support mechanism being movably connected to the cap;
a backlight module having a light source and a light guide plate, the light guide plate having a first connection member and a second connection member corresponding to each cap, light of the light source being incident into the light guide plate and being emitted toward each cap from the light guide plate;
a membrane having a switch corresponding to each cap, the membrane being disposed under the light guide plate; and
a capacitive touch sensing sheet disposed on the light guide plate, the first connection member and the second connection member passing through the capacitive touch sensing sheet to be movably connected to the support mechanism, so as to make the cap movable downward relative to the membrane for triggering the switch, wherein the capacitive touch sensing sheet comprises a transparent substrate and a transparent touch electrode layer, the transparent touch electrode layer is formed on a bottom surface of the transparent substrate, and light emitted out of the light guide plate passes through the transparent touch electrode layer and the transparent substrate to be incident to each cap.

12. The keyboard of claim 11, wherein a scattering structure is formed at a position of the transparent substrate where light is incident to each cap.

13. A keyboard with light-emitting and touch functions, the keyboard comprising:
a plurality of keyswitches, each keyswitch comprising a cap and a support mechanism, the support mechanism being movably connected to the cap;
a membrane having a switch corresponding to each cap;
a backlight module disposed on the membrane, the backlight module having a light source and a light guide plate, the light guide plate having a first connection member and a second connection member corresponding to each cap, the first connection member and the second connection member being movably connected to the support mechanism to make the cap movable downward relative to the membrane for triggering the switch, and light of the light source being incident into the light guide plate and being emitted toward each cap from the light guide plate; and
a capacitive touch sensing layer formed under the light guide plate and located between the light guide plate and the membrane;
wherein the capacitive touch sensing layer comprises a touch electrode layer with a plurality of electrodes, and at least a light exit region is defined within at least one of the plurality of electrodes to permit light emitted from the light guide plate to pass through the light exit region and the cap.

14. The keyboard of claim 13, wherein the first connection member and the second connection member are connected to the light guide plate by an insert molding process or a thermoforming process.

15. The keyboard of claim 14, wherein the first connection member has a fixing end portion, the light guide plate has a concave slot formed thereon corresponding to the fixing end portion, and the fixing end portion is contained in the concave slot to fix the first connection member to the light guide plate.

16. A keyboard with light-emitting and touch functions, the keyboard comprising:
a plurality of keyswitches, each keyswitch comprising a cap and a support mechanism, the support mechanism being movably connected to the cap;
a backlight module having a light source and a light guide plate, light of the light source being incident into the light guide plate and being emitted toward each cap from the light guide plate;
a board disposed on the backlight module, the board having a first connection member and a second connection member corresponding to each cap;
a membrane having a switch corresponding to each cap, the membrane being disposed on the board; and
a capacitive touch sensing sheet disposed on the membrane, the board being disposed between the light guide plate and the membrane, the first connection member and the second connection member passing through the membrane and the capacitive touch sensing sheet to be movably connected to the support mechanism, so as to make the cap movable downward relative to the board for triggering the switch;
wherein the capacitive touch sensing sheet comprises a touch electrode layer with a plurality of electrodes, and at least a light exit region is defined within at least one of the plurality of electrodes to permit light emitted from the light guide plate to pass through the light exit region and the cap.

17. The keyboard of claim 16, wherein the capacitive touch sensing sheet comprises a transparent substrate, the touch electrode layer is formed on a bottom surface of the transparent substrate and has a light exit region corresponding to each cap, and the transparent substrate has a scattering structure formed thereon corresponding to the light exit region to make light emitted from the light guide plate pass through the light exit region and scatter at the scattering structure to be incident to the corresponding cap.

18. The keyboard of claim 17, wherein the scattering structure is formed in the light exit region or formed on a top surface of the transparent substrate.

19. A keyboard with light-emitting and touch functions, the keyboard comprising:
a plurality of keyswitches, each keyswitch comprising a cap and a support mechanism, the support mechanism being movably connected to the cap;

a backlight module having a light source and a light guide plate, light of the light source being incident into the light guide plate and being emitted toward each cap from the light guide plate;

a board disposed on the backlight module, the board having a first connection member and a second connection member corresponding to each cap;

a membrane having a switch corresponding to each cap, the membrane being disposed on the board; and a capacitive touch sensing sheet disposed on the membrane, the first connection member and the second connection member passing through the membrane and the capacitive touch sensing sheet to be movably connected to the support mechanism, so as to make the cap movable downward relative to the board for triggering the switch, wherein the capacitive touch sensing sheet comprises a transparent substrate and a transparent touch electrode layer, the transparent touch electrode layer is formed on a bottom surface of the transparent substrate, and light emitted out of the light guide plate passes through the transparent touch electrode layer and the transparent substrate to be incident to each cap.

20. The keyboard of claim 19, wherein a scattering structure is formed at a position of the transparent substrate where light is incident to each cap.

21. A keyboard comprising:

a plurality of keyswitches, each keyswitch comprising a cap and a support mechanism, the support mechanism being movably connected to the cap;

a capacitive touch sensing sheet disposed under at least a portion of the keyswitches, generating a touch signal in response to a touch input operation above the portion of the keyswitches; and a light source, configured in optical communication with the cap such that light of the light source is emitted toward each cap from a bottom side of the capacitive touch sensing sheet;

wherein lower ends of the support mechanism pass through the capacitive touch sensing sheet, while upper ends of the support mechanism movably connect to the cap;

wherein the capacitive touch sensing sheet comprises a touch electrode layer with a plurality of electrodes, and at least one of the electrodes is transparent or the at least one of the plurality of electrodes comprises a light exit region, such that light emitted from the light source passes through the cap and the at least one of the electrodes.

* * * * *